United States Patent [19]
Synek et al.

[11] 4,400,589
[45] Aug. 23, 1983

[54] SUBSCRIBER STATION NETWORK

[75] Inventors: Jan Synek, Chicago, Ill.; Michael Tentler, Kenosha, Wis.

[73] Assignees: United Networks, Inc., Chicago, Ill.; Manu-Tronics, Inc., Kenosha, Wis.

[21] Appl. No.: 283,116

[22] Filed: Jul. 13, 1981

Related U.S. Application Data

[63] Continuation-in-part of Ser. No. 78,517, Sep. 24, 1979, abandoned, which is a continuation-in-part of Ser. No. 41,004, May 21, 1979, Pat. No. 4,303,805.

[51] Int. Cl.³ .............................................. H04M 1/58
[52] U.S. Cl. ................................ 179/81 R; 179/81 A
[58] Field of Search ................ 179/81 R, 81 A, 81 R, 179/84 VF, 90 K

[56] References Cited
U.S. PATENT DOCUMENTS
3,823,272 7/1974 Tabalba .......................... 179/81 A Primary Examiner—Joseph A. Popek
Attorney, Agent, or Firm—McDermott, Will & Emery

[57] ABSTRACT

A solid state network for subscriber station is amenable to hybridization and mass production, minimizing costly, heavy components, facilitating transmission and reception of communication signals almost independently of variation in line impedance, and controlling a sidetone level with in-phase signals, through the use of as few as one transmitting transistor that is in series with the transmitter and also in series with the receiver, and as few as one receiving transistor.

7 Claims, 5 Drawing Figures

SUBSCRIBER STATION NETWORK

This is a continuation-in-part of our application Ser. No. 78,517, filed on Sept. 24, 1979, and since abandoned, which was a continuation-in-part of our application Ser. No. 41,004 filed May 21, 1979 now U.S. Pat. No. 4,303,805.

BACKGROUND OF THE INVENTION

Telephone subscriber stations in general include components for signalling an incoming call, for indicating the busy or idle condition of the station, for directing destinations, and for communication with other subscriber stations. Among the components used to facilitate the communication between connected subscriber stations are inductive elements, such as transformers. These inductive elements, besides being costly, are also cumbersome, especially in comparison with modern solid state and integrated circuitry. Because inductive components are not amenable to hybridization, their inclusion in a circuit limits the otherwise obtainable advantages of solid state miniaturization and hybridization.

The inductive elements are used for matching the load of subscriber station networks. The load includes the telephone lines coupling the subscriber stations to the central office. The characteristics of the lines can vary depending upon such variables as ambient climatic conditions. Networks using inductive components are used to match the substation to an average line length and ambient condition. The inductive components are not readily variable, because of cost and physical condition. Thus, the average substation is typically not properly matched to the telephone line.

The condition of the substation that is not properly matched which causes the most difficulties occurs where the transmission and reception of communication signals is overly attenuated. With the advent of solid state electronics, it is easier to equip the substation with amplifiers to aid in overcoming the impedance matching problems. This, of course, is an expensive way of doing things, so that the cost effectiveness of the system rapidly deteriorates.

Inductors are also traditionally used to provide the 4-line to 2-line conversion necessary for coupling the transmitter and the receiver of the subset to the bi-directional 2-line phone lines linking the subset to the central office. Such elements are required to provide isolation between the simultaneously transmitted and received signals.

Where these coupling inductors have been eliminated, complex gyrator or bridge circuit configurations utilizing typically several solid state active devices have been used. One such circuit based on this concept is disclosed in U.S. Pat. No. 3,823,272 entitled "Electronic Telephone Transmission Circuit" invented by C. M. Tabalba issued July 9, 1974. Another is disclosed in U.S. Pat. No. 4,071,713 entitled "Telephone Speech Network" invented by M. G. Sencer issued Jan. 31, 1978. Such prior art circuits are not amenable to implementation in simple series and series/parallel configurations utilizing as few as two transistors.

Accordingly, an object of the present invention is to provide new and unique electronic subscriber station networks.

Yet another object of the present invention is to provide solid state networks for subscriber stations with the transmit and receive signals almost constant independent of variations in the line length.

Still another object of the present invention is to provide amplification both for the transmitter and receiver in the subscriber subset.

Still another object of the present invention is to provide electronic network circuits which limit the current going through the transmitter, thereby preventing its overload. The current limiting, which is inherently provided by the electronic circuit network used for controlling load matching and sidetone, also eliminates the need for transmitter overload protection.

Another object of the present invention is to effectuate all necessary transmitting and receiving functions of the subscriber subset by simple series and parallel circuit configurations, eliminating the bridge circuit configurations typically employed.

Another object of the present invention is to minimize the circuitry required to perform the objects of this invention, thereby increasing its cost effectiveness in mass production.

Yet another related object of the present invention is to achieve circuit minimization by utilizing the transmitting circuitry as well as the receiving circuitry to control the level of the signal through the receiver.

Yet another related object of the present invention is to use the same circuitry, without additional active devices, to control the amplitude of the sidetone and make it almost constant irrespective of line impedance, by utilizing in-phase control signals.

Still another object of the present invention is to provide solid state telephone networks which eliminate inductive components and are accordingly readily amenable to hybridization.

BRIEF SUMMARY OF THE INVENTION

A preferred embodiment of the present invention comprises a solid state subscriber station network which provides high quality transmission and reception of communication signals on standard telephone lines. A two wire telephone line is coupled through a diode bridge circuit to the receiver and transmitter of the subset. The diode bridge serves to maintain one segment of the trip line, or line T, at a positive potential with respect to a segment of the ring line, or line R.

A first active element, such as a transistor, is associated with the transmitter and the transmitting function, and also associated with the receiver and the receiving function. A second active element is associated with the receiver and receiving function.

The transmitter is coupled across the telephone lines in a series configuration comprising the transmitter, the active transmitting device, and passive components. More particularly, the transmitter is coupled across the telephone lines in series with the collector-emitter port of a single amplifying transmitting transistor and passive components, creating a simple series circuit spanning the phone lines.

The receiver is coupled across the telephone lines in a configuration comprising the receiver, the active receiving device, the aforementioned active transmitting device, and passive coupling components. More particularly, the receiver is connected across the telephone lines in series with both the collector-emitter port of a single receiving transistor and the collector-emitter port of a single transmitting transistor, and passive coupling components. Concurrent utilization of the transmitting transistor for the receiving function is accomplished by connecting the aforementioned transmitting series circuit to the emitter of the receiving transistor, such that the receiving circuitry parallels the transmitter portion of the series transmitting circuitry.

The base of the receiving transistor is AC coupled to the telephone line signal through a passive network which extends across the telephone lines. This base signal is in-phase with the emitter signal of the transmitting transistor as applied to the emitter of the receiving transistor. The ratio of these in-phase signals controls the gain of the receiving transistor and, similarly, the ratio of the transmitted signals controls the amplitude of the sidetone.

The transistors act as amplifiers of the AC signals of the respective receiver and transmitter. Feedback circuits using resistors and capacitors control the gain and operating points of both active elements, compensating for variations in the line impedance.

In another embodiment, a two wire telephone line is also coupled through a diode bridge circuit to the receiver and transmitter of the subscriber set. The receiver is coupled to line T by a first active device, and is connected to line R through the transmitter. More particularly, the first active device is a receiving transistor connected as an emitter follower.

A second active device is connected between line T and the junction of the receiver and transmitter. More particularly, the junction between the receiver and transmitter is coupled to line T through a transmitting transistor connected as a constant current source, creating a series configuration of the collector-emitter port of the transmitting transistor, passive components, and the transmitter. This series configuration is connected by the receiver and passive components to the receiving circuitry, such that the receiving circuitry parallels a portion only of the transmitting series circuitry, that portion containing the transmitting transistor.

The passive components coupling the transmitter to the second transmitting transistor comprises a voltage divider which serves to control the amount of sidetone that will be heard in the receiver. Further, the operation of the transmitting transistor as a constant current source insures that the circuit operation is effectively independent of the line impedance.

The circuitry of both embodiments are readily adapted for rotary dial telephones, for standard multi-frequency tone telephones, and for telephones using available commercial printed circuit dialing networks.

BRIEF DESCRIPTION OF THE DRAWINGS

The above-mentioned and other objects and features of the invention will be best understood by making reference to the accompanying drawings, wherein.

DETAILED DESCRIPTION OF THE DRAWINGS

Figure 1:
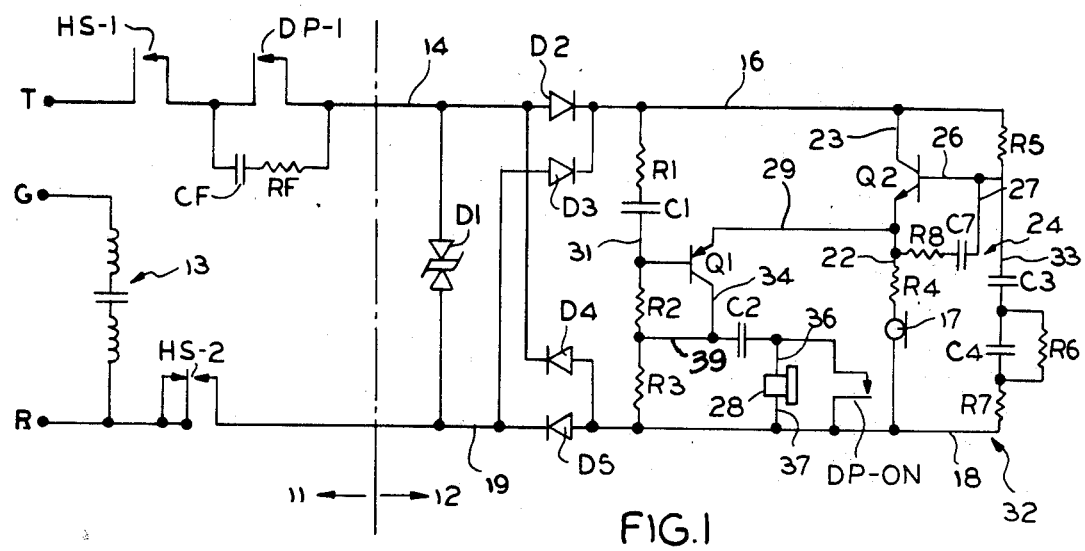
FIG. 1 is a schematic of a solid state subscriber station network connected in a rotary dial operated system.

FIG. 1 is divided by a dashed line. To the left of the dashed line are portions of a standard telephone subscriber station connected to the telephone system over lines T and R. To the right of the dashed line 12, is the inventive solid state network. Line T is connected to the remaining telephone circuitry through hook switch contacts HS-1. As is well known, these contacts are in the normally open position until the handset is removed from the hook switch or other appropriate "on line" switching means are activated. Dial pulse contacts DP-1 are shown in series with the hook switch contacts HS-1. The dial pulse contacts are shown bridged by a filter network comprising capacitor CF in series with resistor RF.

Line R is shown connected to ground through the well known ringer 13. Line R is also shown connected to the network at 12 through well known hook switch contacts indicated as HS-2.

In the solid state telephone network 12 means are provided for protecting the network from current surges and polarity reversals. More particularly, lines T and R are bridged by a transient voltage suppressor, D1. Immediately after suppressor D1 is a rectifier bridge comprising diodes D2–D5. The loop current normally flows from terminal T through the normal telephone subscriber set components shown at 11 into section 14 of line T of the two line telephone system through the rectifier bridge, section 16 of line T1, an NPN transistor Q2, resistor R4, the telephone transmitter 17, line section 18 of the line R of the two line telephone system, and back through the diode bridge over line R, line section 19, through hook switch contacts HS-2, to terminal R. The transmitting transistor, Q2, is thus in series with the transmitter, in a series circuit connecting T and R comprising the collector-emitter port of Q2, connecting resistor R4, and the transmitter.

The user of the telephone, in speaking into the telephone transmitter 17, modulates the loop current, thereby applying an AC signal to the emitter of transistor Q2 over conductor 22. Transistor Q2 acts as a common base amplifier to this modulated current. The amplified signal at the collector of transistor Q2 is applied to the telephone line through conductors 23 and 16, the diode bridge, conductor 14, contacts DP-1 and contacts HS-1.

Means are provided for controlling the transmission gain of transistor Q2. More particularly, a series RC network 24 comprising resistor R8 connected to conductor 22, capacitor C7, conductor 27, and conductor 26, extends between the emitter and the base of transistor Q2. A resistor R5 coupled between the base and the collector of transistor Q2 determines the quiescent working point of transistor Q2. A resistor R4 in series between the emitter of transistor Q2 and the microphone or transmitter 17 increases the negative current feedback.

Means are provided for balancing the sidetone in the receiver 28. More particularly, PNP transistor Q1 and associated circuitry perform this function, as well as other important functions. DC current for transistor Q1 and a portion of the signal as modulated by the transmitter are supplied to the emitter of transistor Q1 only from the emitter of Q2 in the previously described series transmitting circuit through conductor 29. The transmitted signal is applied to the base of transistor Q1 over a circuit that includes conductor 16, the series circuit comprising resistor R1, capacitor C1, conductor 31, resistors R2 and R3. The base of transistor Q1 is coupled directly to conductor 31. The transmitted signals coming to the base and to the emitter of transistor Q1 are in-phase. Therefore, by adjusting the level of the individual signals, it is possible to adjust the amplitude of the sidetone or, in fact, to reduce it to insignificant levels.

Means are provided to compensate for the effects of changes in line impedance. More particularly, a line impedance compensating network 32 is provided. The compensating network 32 comprises the series connection of conductor 33, capacitor C3, the combination of capacitor C4 and resistor R6 in parallel, and resistor R7. One side of capacitor C3 is connected to the base of transistor Q2 through conductor 26. One side of capacitor C4 is connected through resistor R7 to line section 18 of line R.

The circuit thus described has extreme sensitivity to line impedance changes due to the negative feedback generated at transistor Q2. It has been noted that a change in the nature of a multiple of five in the line impedance does not imbalance the circuit.

Means are provided for amplifying the received signal from the telephone line. The means includes the previously described transistor Q1. The received AC signal from line section 16 goes through resistor R1, capacitor C1 and conductor 31 to the base of transistor Q1. The amplified received signal appears at the collector of transistor Q1, and is connected to the receiver 28 through conductor 34, capacitor C2, and conductor 36. The other side of the receiver is coupled to line section 18 of line R through conductor 37. The receiver is shown as being paralleled by dial pulse off-normal contacts DP-ON.

A portion of the received AC signal appears also at the base of transistor Q2 through resistor R5, the portion being determined by divider network comprising resistor R5 and network 32. In this situation transistor Q2 acts as an emitter follower for the received signal and transmits that received signal to the emitter of transistor Q1 over conductor 29.

The received signal is amplified by transistor Q1, if the signal on the base of transistor Q1 is higher than the signal on the emitter of transistor Q1. The gain of transistor Q1 is adjusted by selecting a ratio of the incoming AC signal received by transistor Q1 directly from the line and the incoming signal received by transistor Q1 from transistor Q2. The coupling capacitor C2 in conjunction with resistor R3 prevents the DC signals from going through the receiver.

Since the transistor Q2 electronic circuit described acts as a constant current source, it inherently limits the current through the transmitter and precludes overloading. Thus, the varistors normally used to protect the transmitter are not required in this circuit.

The transmitted signal level is automatically adjusted by the feedback of the above described circuitry for different loop lengths and impedances. The longer the loop, the higher the transmitted signal. The automatic signal level adjustment equalizes the signal at the central office. It should be noted that all parameters of the electronic network can be set to match standard telephone networks. Also, it is possible to increase the gain for the received signal or the transmitted signal or both signals, if needed, in addition to the automatic line impedance adjustments discussed.

Figure 2:
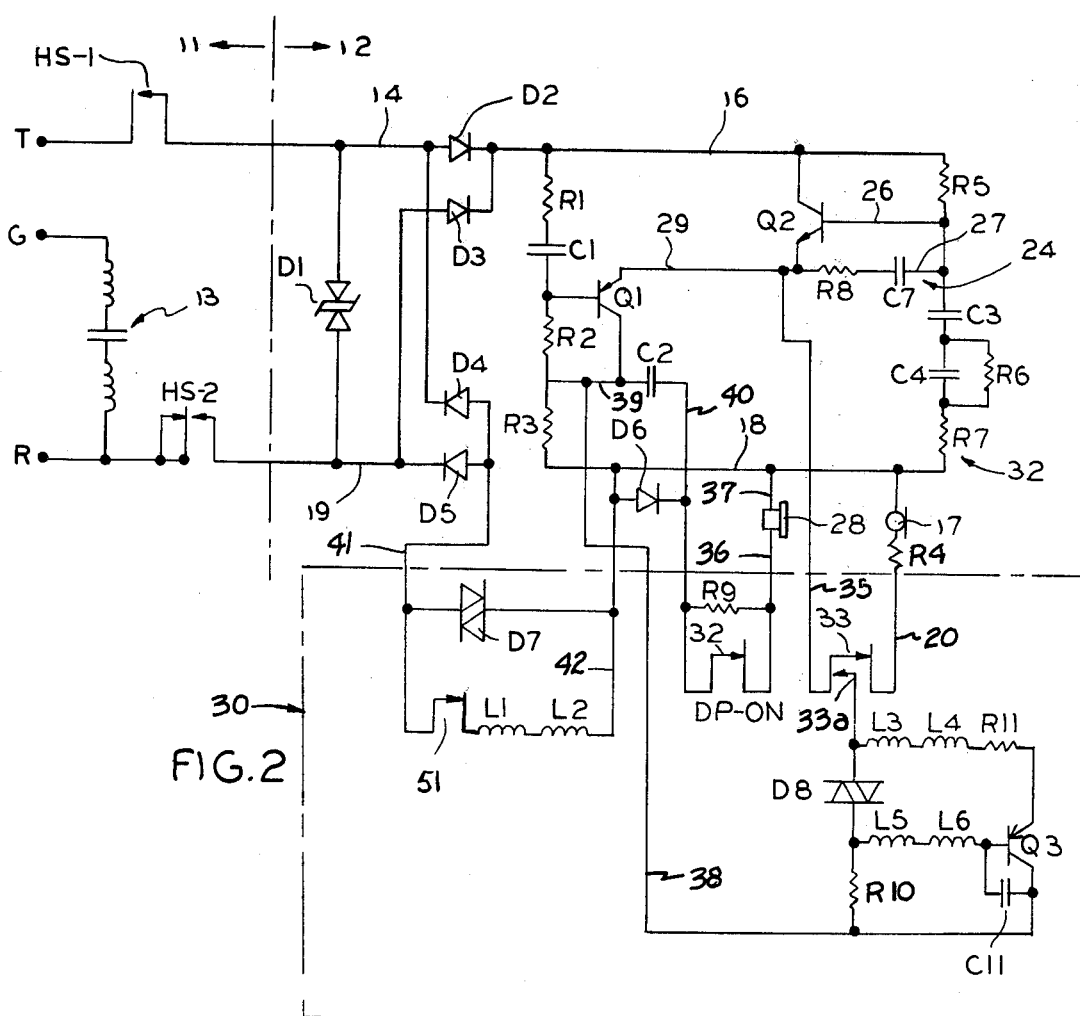
FIG. 2 is a schematic of the solid state subscriber station network connected in a multi-frequency tone operated system.

In FIG. 2 the same component designations are used for the same parts of the solid state telephone network of FIG. 1. Thus, the solid state telephone network of FIG. 2, as shown, uses the basic components of the solid state telephone network of FIG. 1, except that FIG. 2 shows a dial tone multi-frequency telephone system, rather than a dial telephone system. For example, the network coming from the telephone lines at 11 is exactly the same as that described in FIG. 1, except for the absence of the dial pulse contacts in line T.

A simplified showing of a standard dial tone multi-frequency key pad 30 is included in FIG. 2. The transmitter 17 is shown connected through the key pad to the emitter of transistor Q2. More particularly, a path is provided from line section 18, transmitter 17, resistor R4, conductor 20, common contacts 33, conductor 35, and conductor 29 to the emitter of transistor Q2. When any digit button is operated, the common contacts all operate; the contacts 33 open and contacts 33a close.

The contacts 33a couple an oscillator to transistor Q2. The oscillator comprises a PNP transistor Q3 and associated circuitry.

The collector of transistor Q3 is coupled to line section 18 through conductor 38, conductor 39, and resistor R3. The emitter of transistor Q3 is also coupled to conductor 38 through the series connection of resistor R11, inductors L3 and L4, varistor diode D8 and resistor R10. The base of transistor Q3 is coupled both to the junction of diode D8 and resistor R10 by inductors L5 and L6 in series, and to the collector of Q3 by capacitor C11.

The telephone line diode bridge is connected into the key pad over conductor 41, normally closed common contacts 51 of the key pad 30, inductors L1 and L2 in series, and conductor 42 to line section 18. A varistor D7 is connected from conductor 41 to conductor 42 where it shunts the inductors L1 and L2 when contacts 51 are closed.

The receiver 28 is connected through key pad 30 to receiver amplifying transistor Q1. More particularly, a path extends from line section 18, through conductor 37, receiver 28, conductor 36, common contacts 32, conductor 40 and capacitor C2 to the collector of transistor Q1. The common contacts are paralleled by resistor R9 which serves to mute the receiver during transmission of the dial tones. A receiver clamping diode D6 connects conductor 40 to conductor 18.

Thus, the electronic network readily interfaces with multi-frequency dial systems. Transistor Q2 serves to amplify the output of the oscillator as well as performing its previously described functions relating to transmitting, receiving, and sidetone control. The benefit of the lightweight, inexpensive, reliable and compensated system is that, among other things, it is operable with both multi-frequency and pulse dialing telephones.

There are now commercially available integrated circuit dials, such as the Motorola MC 14409. The electronic telephone network described herein is also amenable to use with such dialers.

Figure 3:
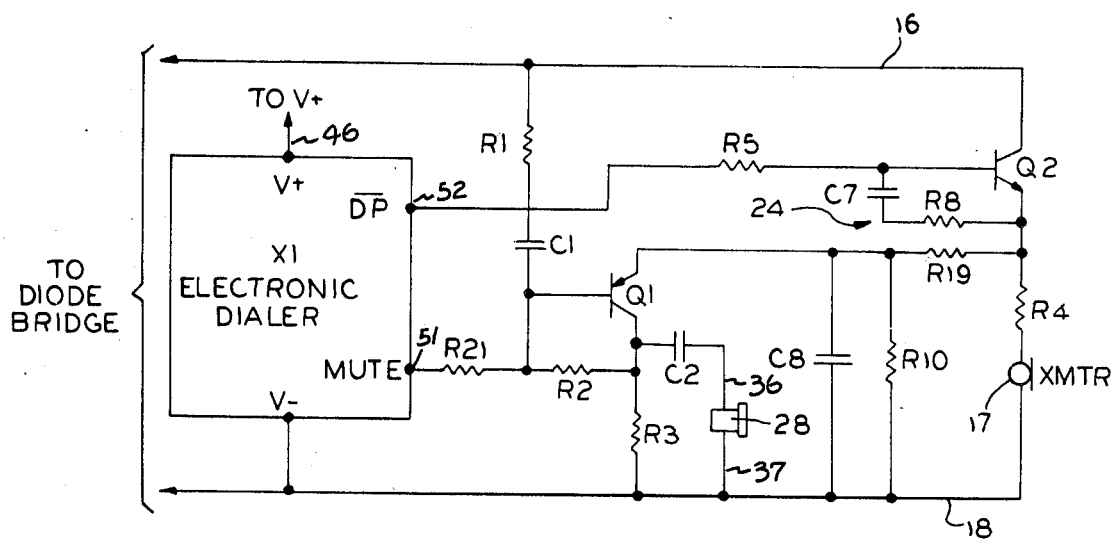
FIG. 3 is schematic of the solid state subscriber station network interfaced with a commercially available integrated electronic dial system.

FIG. 3 shows the interface between a Motorola MC 14409 circuit dialer and the FIG. 1 solid state telephone network. Again, where possible, components in FIG. 3 bear the same designation numbers as the components in FIG. 1.

The electronic dialer is indicated as X1. It is shown connected to positive voltage at arrow 46. The line portions 16 and 18 are shown terminating in arrows leading to the diode bridge previously shown. The negative voltage terminal of dialer X1 is connected to line section 18. It should be understood that the positive and negative signals are examples only. The voltages could be reversed by using PNP transistors in place of the NPN transistors and vice versa, for example.

Means are provided for muting the receiver during dialing. More particularly, the junction of resistors R2, capacitor C1 and the base of transistor Q1 is connected through resistor R21 to the mute terminal 51 of the electronic dialer.

Dial pulse amplifying means are provided. More particularly, the collector of transistor Q2 is connected directly to line section 16. The base of transistor Q2 is coupled through resistor R5 to the dial pulse terminal $\overline{DP}$ 52 of the electronic dialer X1. The base of transistor Q2 is also connected to the emitter of Q2 by the series feedback circuit of capacitor C7 and resistor R8. The transmitter 17 is connected to the emitter of transistor Q2 through resistor R4, forming a series circuit spanning line sections 16 and 18.

The emitter of transistor Q2 is connected to the emitter of transistor Q1 through resistor R19. The junction of resistor R19 and the emitter of transistor Q1 is connected to conductor 18 through resistor R10 and supply capacitor C8 in parallel. The supply capacitor is of a size that provides power, but still enables feedback.

Figure 4:
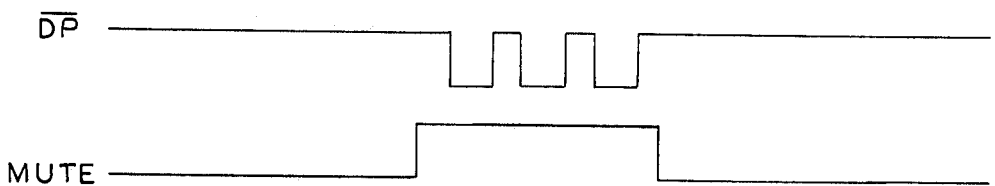
FIG. 4 indicates certain of the outputs of the electronic dial system.

FIG. 4 shows a typical timing diagram when the digit 3 has been dialed indicating the dial pulse lengths and the muting signal lengths.

The difference in operation of FIG. 3 and the electronic circuitry of FIGS. 1 and 2 is that transistor Q2 is used for dial signal commutation as well as for transmitter amplification and sidetone control. The low level pulses on the dial pulse terminal $\overline{DP}$ turns transistor Q2 to the off condition through resistor R5. The transistor Q2 is normally biased in the active condition by the high level voltage on the $\overline{DP}$ output terminal.

In this circuit, transistor Q2 also works as a voltage follower and constant current source. The quiescent loop current in the telephone line and through the transmitter is determined by the voltage level at the $\overline{DP}$ output terminal. It is thus independent of the loop length and line impedance.

Transistor Q1, in addition to its function as a receiver amplifier, also operates to mute the receiver during dialing. PNP transistor Q1 is turned off by a high level applied to the base from the mute terminal 51 of the dialer X1 through resistor R21.

Figure 5:
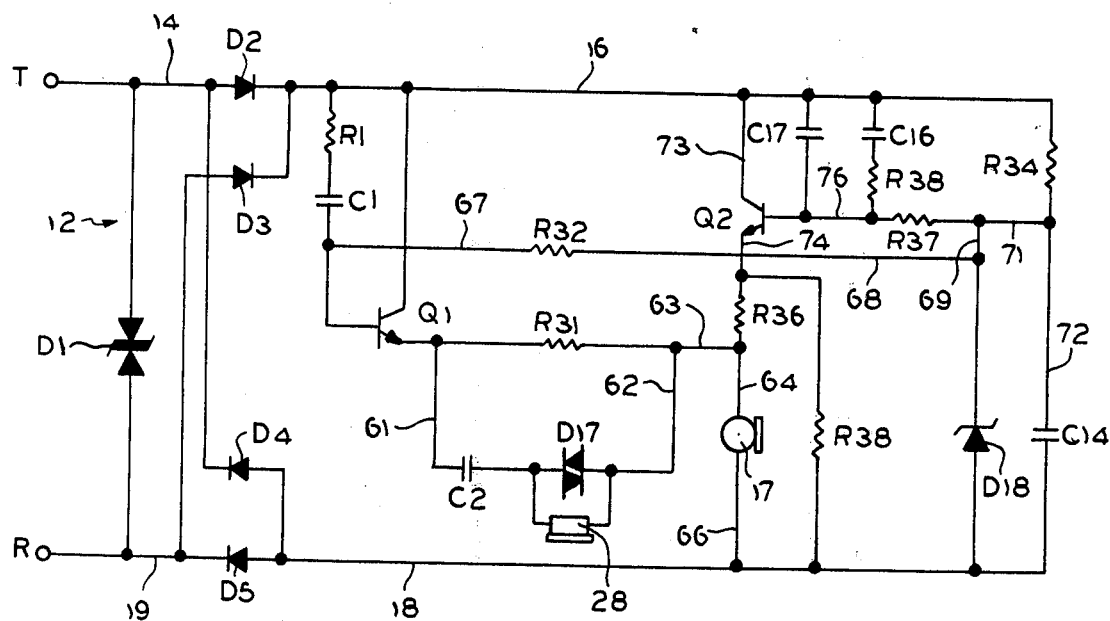
FIG. 5 is a schematic of another embodiment of a solid state subscriber station network connected in the rotary dial operated system of FIG. 1.

The schematic of FIG. 5 is another embodiment of the present invention comprising a solid state subscriber station network, using the rotary dial operated system as depicted in FIG. 1. Thus, FIG. 5 shows another version of the portion 12 of the network of FIG. 1.

Line T is indicated by numeral 14 and line R is indicated by numeral 19, just as they were in FIG. 1. In the network 12, means are provided for protecting the network from current surges. As shown, lines T and R are spanned by the transient voltage suppressor, D1. The rectifier bridge comprises diodes D2, D3, D4, and D5, and serves to maintain segment 16 of T at a positive potential relative to segment 18 of R.

Means are provided for the transmission of signals over the telephone line in a fashion similar to that of FIG. 1. Loop current passing through the series combination of conductor 73, the emitter-collector port of transistor Q2, conductor 74, resistor R36, conductor 64, transmitter 17, and conductor 66 is modulated in accordance with the audio input to the transmitter, thereby applying an AC signal to the emitter of transistor Q2. The amplified signal at the collector of transistor Q2 is applied to the telephone line through conductors 73 and 16, the diode bridge, and conductor 14.

The NPN transmitter amplifier transistor Q2 works in the constant current source mode. Its quiescent working point is determined by resistors R34, R37 and the zener diode D18. Resistor R34 is connected to segment 16 of line T, and is in series with the combination of diode D18 in parallel with the series combination of conductors 71, 72 and capacitor C14. Zener diode D18 and capacitor C14 are connected to segment 18 of line R. The node between resistor R34 and diode D18 is connected to the base of transmitting transistor Q2 by resistor R37 and conductor 76. Capacitor C14 serves to filter off any AC which may develop across the zener when it is not fully saturated.

The AC gain of transistor Q2 is determined by resistors R34, R37, and the series combination of resistor R40 and capacitor C16 connected between conductors 76 and 16. In addition, a capacitor C17 is connected between the base of transistor Q2 and line segment 16 to function as a radio frequency suppressor.

Means are provided for amplifying received signals on the lines going to the subscriber set. More particularly, a first NPN transistor Q1 is shown connected in the emitter follower mode. The base of transistor Q1 is coupled through capacitor C1 in series with resistor R1 to segment 16 of line T. The collector of transistor Q1 is connected directly to line segment 16. The emitter of transistor Q1 is coupled only to the series transmitting circuitry previously described at the node between resistor R36 and the transmitter 17, by conductor 63 and the combination of resistor R31 in parallel with the series circuit of conductor 61, capacitor C2, receiver 28, and conductor 62. In addition, a varistor diode D17 is in parallel with the receiver 28. The emitter of Q1 is thus AC coupled to the receiver and receives its DC load through resistor R31 and the transmitting circuitry previously traced.

DC bias is provided to the base of transistor Q1 through a circuit that includes conductor 67, resistor R32, conductors 68, 69, 71, and resistor 34 to segment 16 of line T.

Means are provided for controlling the sidetone in the receiver responsive to signals applied to the transmitter. More particularly, a resistor R38 is connected in parallel with the series combination of R36, conductor 64 and the transmitter 17. Thus, resistors R36 and R38 establish a voltage divider network with R38 shunting off a portion of the previously mentioned modulated loop current. The output of the transmitter is connected directly to the emitter of transistor Q1 through resistor R31 and conductor 63, while the divided signal as amplified by transistor Q2 is applied to the collector of transistor Q1 and to the base of transistor Q1 through resistor R1 and capacitor C1. These direct and divided signals are in-phase. Thus, the receiver 28 is actuated by the differences, if any, in the two in-phase signals. The ratio of resistor R36 to resistor R38 controls the relative level of the sidetone generated.

It should be understood that the circuitry of FIG. 5 can be modified to be included in a multi-frequency tone system or in integrated electronic dial systems in the same manner as shown in FIGS. 2 and 3 modifying FIG. 1.

Typical component values in the circuitry of FIG. 1 are:

| | | |
|---|---|---|
| R1 = 22K Ohms | R6 = 13K Ohms | C3 = .22 fd. |
| R2 = 22K Ohms | R7 = 10K Ohms | C4 = .022 fd. |
| R3 = 390 Ohms | R8 = 100 Ohms | C7 = 10 fd. |
| R4 = 100 Ohms | C1 = .22 fd. | Q1 = 2 N 5401 |
| R5 = 22K Ohms | C2 = 10 fd. | Q2 = 2 N 3053 |

Thus, the electronic telephone network performs the functions of the telephone networks that use "iron" and inductors in a more efficient manner and is amenable for hybridization and for use with rotary dial systems, with dial tone multi-frequency systems and with commercially available integrated circuit dialers.

Further, the electronic telephone network described herein is basically a constant current device. Therefore, there is less need to compensate for current variations. For example, there is no need for varistor protection of the receiver or transmitter elements, which incidentally is a factor in the amenability to hybridization of the above described network.

The current characteristics make the electronic telephone network less sensitive to variations in line length and more independent of input impedance in general. This characteristic enables more consistent control of sidetones.

Another major feature of the electronic telephone network, especially considering the problems of energy supply and cost, is that the electronic network uses significantly less energy than standard networks. As an example, on short loop conditions, the standard telephone networks may draw up to 100 ma as opposed to 20 ma for the above described electronic telephone network. Thus, large scale use of the electronic telephone network would effect large savings in energy and energy costs.

Yet another significant inherent feature of the electronic telephone network is that because they are active devices, a gain can be achieved and controlled for both the received signal and transmitted signal. Thus, any loss because of compensation used in the electronic telephone network is easily cancelled.

While the principles of the invention have been described above in connection with specific apparatus and applications, it is to be understood that this description is made by way of example only and not as a limitation on the scope of the invention. It is expected that others skilled in the art will perceive variations which, while differing from the foregoing, do not depart from the spirit and scope of the invention as described and claimed.

We claim:

1. An improved subscriber station network for a telephone system including telephone lines for connecting said subscriber station to other telephone subscriber stations,
   said telephone system comprising at least two lines having a DC potential therebetween,
   telephone receiver means for receiving communications from said lines,
   telephone transmitter means for transmitting communication signals over said lines,
   the improvement characterized in that a transmitter transistor means is provided in a series circuit with said transmitter means,
   said series circuit coupled between said at least two lines,
   means connecting said transmitter transistor to said receiver means to control the level of the signal passing through said receiver means,
   bridge means for maintaining one of said at least two lines at a positive potential and the other of said at least two lines at a negative potential,
   receiver transistor means provided in said receiver means, and
   means for connecting said receiver transistor means through said receiver means to said transmitter means where said transmitter means connects said transmitter transistor means to said series circuit.

2. The subscriber station network of claim 1 wherein said receiver transistor is connected as an emitter follower.

3. The subscriber station of claim 1 wherein said transmitter transistor is connected as a constant current source.

4. The subscriber station network of claim 1 wherein the emitter of said receiver transistor is coupled to said receiver means, said network including a first sidetone controlling resistor paralleling said receiver means, and a second sidetone controlling resistor in the series circuit between said transmitter means and said transmitter transistor.

5. The subscriber station network of claim 4 wherein the base of said receiver transistor is coupled to the positive one of said at least two lines, the collector of said transmitter transistor also being coupled to the positive one of said at least two lines.

6. The subscriber station network of claim 5 wherein a voltage divider network is provided between said two lines, the base of said transmitter transistor being connected to said voltage divider network, the emitter of transmitter transistor being connected through said second sidetone controlling resistor to said transmitter means and a third sidetone controlling resistor bridging said second sidetone controlling resistor in series with said transmitter means to connect to the negative one of said at least two lines.

7. The subscriber station network of claim 1 including a junction between said transmitter means and said transmitter transistor means, means for connecting said receiver means to said junction, and means for connecting said receiver means to the one of said at least two lines that is at a positive potential to apply signals from the transmitter means to both ends of said receiver means in an in-phase relationship whereby the amount of cancellation of the in-phase signals determines the amplitude of the side-tone.

* * * * *